United States Patent [19]
Kroeper

[11] 3,803,936
[45] Apr. 16, 1974

[54] ADJUSTABLE HERRINGBONE GEARS FOR USE IN EMBOSSING, ENGRAVING, AND THE LIKE

[75] Inventor: Bernard Kroeper, Somerville, N.J.

[73] Assignee: Johnson & Johnson, New Brunswick, N.J.

[22] Filed: Oct. 6, 1972

[21] Appl. No.: 295,776

[52] U.S. Cl. .................................. 74/409, 74/440
[51] Int. Cl. ............................................ F16h 55/18
[58] Field of Search .............................. 74/440, 409

[56] References Cited
UNITED STATES PATENTS
1,435,571   11/1922   Wright ................................ 74/440
1,604,105   10/1926   Starkey ............................... 74/440

Primary Examiner—Leonard H. Gerin

[57] ABSTRACT

An improved set of herringbone gears for use in rotary embossing and engraving apparatus. One of the gears has an adjustable center portion in order to obtain positive contact between the teeth on the adjustable center portion and the teeth of the mated gear to prevent backlash and longitudinal side thrusts in the gears.

2 Claims, 8 Drawing Figures

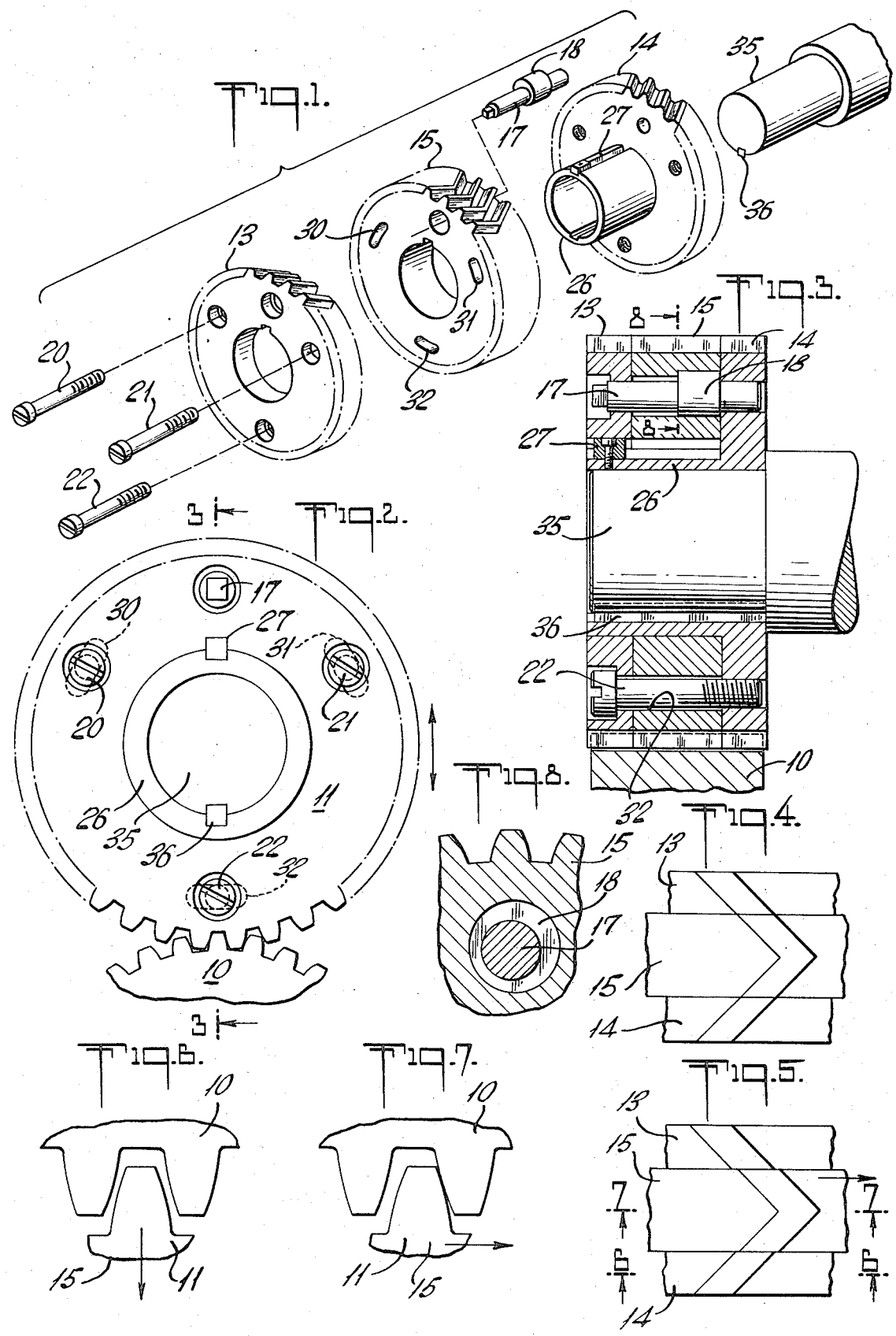

ADJUSTABLE HERRINGBONE GEARS FOR USE IN EMBOSSING, ENGRAVING, AND THE LIKE

This invention relates to a new and improved set of matched gears for use with rotary embossing or engraving machines and the like. Particularly the new gears prevent backlash generated by mating or matched embossing rolls and the gears maintain a minimum longitudinal side thrust after removal of the backlash.

BACKGROUND OF THE INVENTION

In the manufacture of matched steel embossing rolls it is necessary to acid etch not only the male roll but also the connecting herringbone gears which are used to drive the matched rolls. This is done in order that the herringbone gears provide a perfect match for the pair of rolls. In operation when a web or material is passed between the embossing rolls the material will push the two rolls apart very slightly, generally about the thickness of the web being treated. This spacing is generated to the matched gears, and pushes the gears apart the same distance and allows for backlash in the gears. If thicker materials such as cardboard or metal plates are being embossed, the rolls will have to be spaced apart a slight distance to allow for the embossing of the thicker materials and the herringbone gears will be spaced apart the same distance. This spacing allows for backlash in the operation of the rolls and their accompanying gears. This backlash causes misalignment in the patterns on the rolls and very slight misalignment of a few thousandths of an inch will mutilate or destroy the material being embossed, and may mutilate or destroy the embossing rolls themselves. The backlash must be eliminated without altering or disturbing the true apex of the herringbone gears.

Along with this backlash problem there are considerable longitudinal side thrusts placed on the two rolls during the embossing operation. These side thrusts may cause the gears to misalign and destroy the material being embossed or the rolls themselves.

A technique for eliminating the backlash and the longitudinal side thrusts in gears used for embossing rolls is given in U.S. Pat. No. 3,512,477 of Robert L. Nelson issued May 19, 1970. Generally this technique is to split one of the gears so that a portion of one of the gears is adjustable with respect to the remaining portion of the gear and to place a tongue in one gear and a groove in the other or mated gear in order to eliminate the problem of longitudinal side thrusts. This technique has a number of drawbacks in that only the outer half of one of the gears is doing the work of driving the rolls and, if the longitudinal side thrusts are great, as well may be the case with certain embossing patterns, the force on the tongue may be sufficient to crack or break the tongue. The wider and deeper the tongue is made in order to accept the longitudinal side thrusts, the less the area of the teeth of the gear to handle the work of driving the embossing rolls.

SUMMARY OF THE PRESENT INVENTION

I have now discovered a set of matched herringbone gears which require no tongue and groove mechanism to handle longitudinal side thrusts. With my new gears the entire area of the teeth are used to prevent longitudinal side thrusts. My new herringbone gears may be adjusted with respect to each other to prevent backlash in the rolls.

In accordance with the present invention I have developed a set of matched herringbone gears useful in driving embossing rolls, engraving rolls, and the like. My new set of gears comprises a pair of herringbone gears. One of the gears has a center portion which is adjustably secured to the side portions of the gears. In operation the adjustable center portion is positioned so that the teeth on the center portion are in constant contact with the teeth on the matched gear whereby backlash and longitudinal side thrusts are eliminated in the gears during embossing operations.

A BRIEF DESCRIPTION OF THE DRAWINGS

FIG. 1 is an exploded view in perspective of the new adjustable herringbone gear of the present invention;

FIG. 2 is a side view of the new adjustable herringbone gear of the present invention mating with a standard herringbone gear;

FIG. 3 is a cross-sectional view taken along line 3—3 of FIG. 2;

FIG. 4 is a schematic plan view of my new adjustable gear before being adjusted;

FIG. 5 is a schematic plan view of my new adjustable gear after being adjusted;

FIG. 6 is a cross-sectional view taken along line 6—6 of FIG. 5;

FIG. 7 is a cross-sectional view taken along line 7—7 of FIG. 5; and

FIG. 8 is a cross-sectional view of the eccentric taken along line 8—8 of FIG. 3.

PREFERRED EMBODIMENT OF THE PRESENT INVENTION

Referring to FIG. 3, in the drawings, one of the herringbone gears 10 is a solid fixed full width herringbone gear. This gear is secured to the shaft of an embossing roll (not shown). The mating gear 11, more clearly shown in the exploded view of FIG. 1, is made of two helical gears 13 and 14 and a third or center portion 15 which is a herringbone gear. The total width of the three portions is equal to the width of the solid full faced herringbone gear 10. As is more clearly shown in FIGS. 1 and 3, in the center or adjustable portion 15 of the herringbone gear 13 there is a precision eccentric stud 17 (shown in position in FIG. 8) which may be rotated or turned both clockwise or counterclockwise to offset the center herringbone gear just slightly with respect to the two side helical gears 13 and 14. The three portions are held together by three equally spaced clamping screws 20, 21 and 22.

During the manufacture of my adjustable gear absolute accuracy must be maintained. This is accomplished by first machining the three primary elements; i.e., the two side helical gears without teeth and the center adjustable portion without teeth. As is shown in FIG. 3, one side portion 14 has a shoulder 26 extending the full width of the gear on which the center portion and other side portions are seated. The shoulder 26 has a key 27 which extends along the shoulder and carries the remaining portions of the gear in proper alignment. The three pieces 13, 15 and 14 are clamped together and the hole for the eccentric stud 17 bored and the holes for the three screws 20, 21 and 22 drilled and tapped. With the three gear segments in position, and with the master machine key 27 and the three clamping screws in position the blank actually becomes one and is ready for the final machining of the outside diameter and the cutting of the herringbone teeth simultaneously in the three sections. Once the herringbone teeth are cut, the gear may now be disassembled by removing the master machine key and the clamping screws. The hole for the eccentric stud is then enlarged in the center portion as required to accept the eccentric 18. The holes 30, 31, and 32 in the center portion for accepting the clamping screws are provided with clearance for adjustment. The eccentric stud is installed into the center herringbone portion of the gear. The three pieces are placed on the shaft 35 of an embossing roll. The side portion 14 having the shoulder 26 is placed over a key 36 in the shaft 35 and the center adjustable herringbone portion 15 with the eccentric stud 17 is placed up against the inside face of the outer gear portion 14. The other side portion 13 of the gear is placed over the eccentric stud shaft and up against the center portion. The gear is placed on the shaft of the embossing roll with the apex of the teeth in alignment with the deepest portion between the teeth of the solid fixed gear attached to the shaft of the other embossing roll as shown in FIGS. 4 and 6. The clamping screws are reinstalled loosely, the embossing rolls are spaced apart to accept the material to be embossed and the center portion of the adjustable gear is moved into position by means of the eccentric stud so that the teeth of the center portion are in constant contact with the teeth of the fixed gear as shown in FIGS. 5 and 7, and the clamping screws tighten.

The herringbone shaped gear teeth remove the longitudinal side thrusts which may be generated during the embossing operation and the adjustability of the center portion of one of the herringbone gears allows the teeth of that gear to be placed in close contact and to mesh with the teeth of the fixed mated gear over the desired pitch line so that there is constant contact between the teeth as the gears are rotated. This is true even though the rolls are separated a slight distance to allow for the embossing of thicker materials.

Having described the invention in detail it will be readily apparent that various modifications and changes may be made without departing from the spirit and scope of the present invention.

What is claimed is:

1. In a set of matched herringbone gears used in driving embossing rolls, engraving rolls, and the like; the improvement comprising, one of said herringbone gears having two outer portions and a center portion, the center portion having herringbone teeth on its circumferential surface and the outer portions having helical teeth on their outer surfaces, said helical teeth being exact extensions of the herringbone teeth of said center portion, said center portion being adjustably mounted with respect to the outer portions by means of an eccentric stud passing through the center portion and the outer portions, means securing the outer portions to the center portions and to each other after adjusting the eccentric stud so as to misalign the herringbone teeth on the center portion with respect to the helical teeth on the side portions.

2. A pair of matched herringbone gears, one of said gears being an adjustable gear as described in claim 1 and the other of said gears being a fixed gear, with the center portion of said adjustable gear being positioned so that the teeth on said center portions are in contact with the teeth of said fixed gear as the gears are rotated.

* * * * *